UNITED STATES PATENT OFFICE.

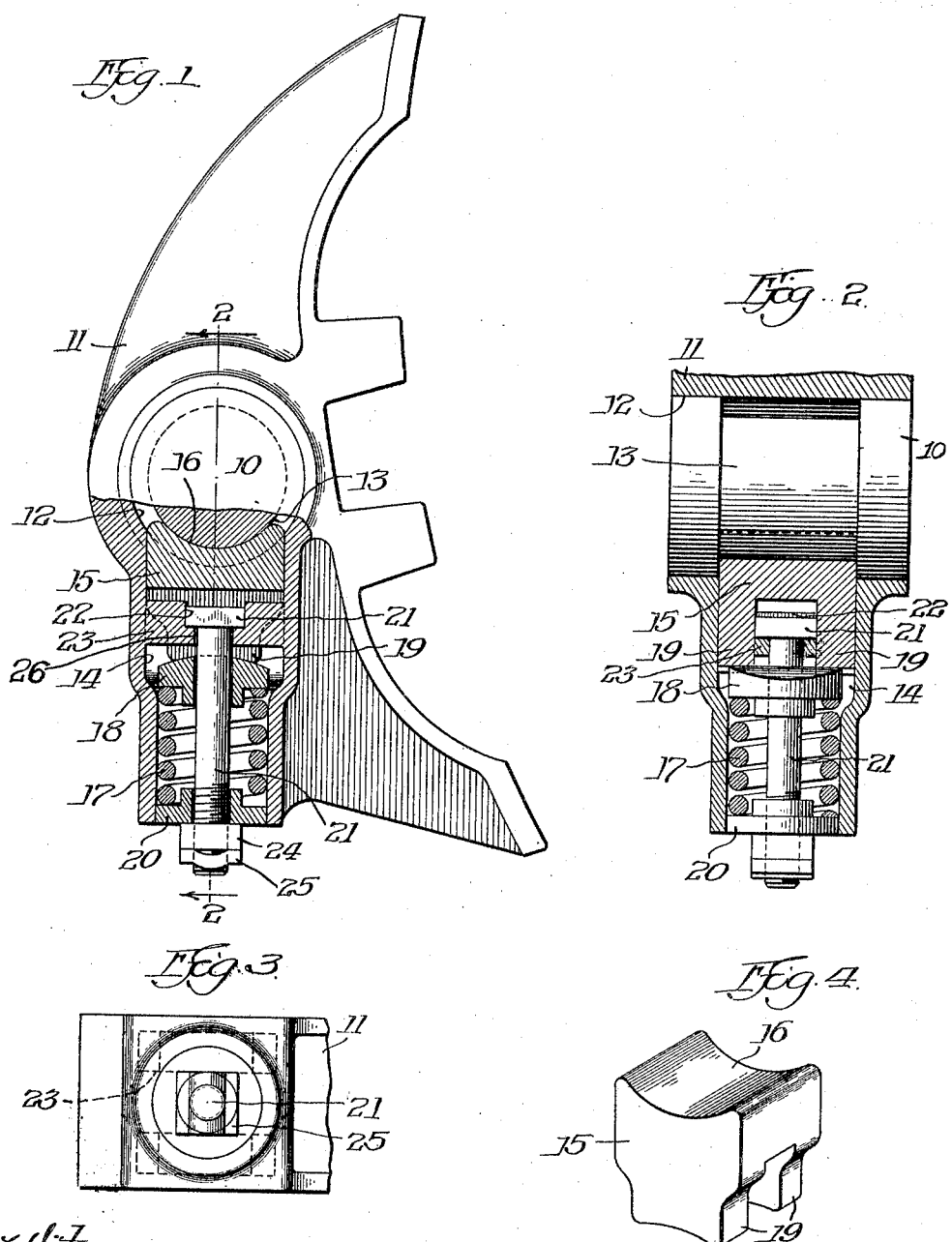

BERNARD CONRATH, OF HAMMOND, INDIANA, ASSIGNOR TO AMERICAN STEEL FOUNDRIES, OF CHICAGO, ILLINOIS, A CORPORATION OF NEW JERSEY.

ADJUSTABLE BRAKE-HEAD.

1,315,932.  Specification of Letters Patent.  Patented Sept. 9, 1919.

Application filed January 10, 1918. Serial No. 211,139.

*To all whom it may concern:*

Be it known that I, BERNARD CONRATH, a citizen of the United States, and resident of Hammond, in the county of Lake, State of Indiana, have invented certain new and useful Improvements in Adjustable Brake-Heads, of which the following is a specification.

This invention relates to adjustable brake heads.

One of the objects of the invention is to simplify brake heads and their manufacture.

Another object is to improve the coöperative action of the various parts by means of which the brake head is frictionally held in adjusted position.

Generally speaking, these and other objects are accomplished by providing a brake head having a body portion with an opening for the reception of a brake beam trunnion, a bearing block, and means including a member anchored within the head for varying the pressure with which the bearing block engages the brake beam trunnion.

The invention is illustrated on the accompanying sheet of drawings, in which—

Figure 1 is a side elevation, parts being in section, of a brake head made in accordance with my invention;

Fig. 2 is a sectional view of the same taken in the plane of line 2—2 of Fig. 1;

Fig. 3 is a fragmentary bottom plan view of the brake head; and,

Fig. 4 is a perspective view of the bearing block which frictionally engages the brake beam trunnion.

The various novel features of my invention will be apparent from the following description and drawings and will be particularly pointed out in the appended claims.

There are many advantages in having brake heads adjustably mounted upon the trunnions of a brake beam, chief among these advantages being that the beam may be hung in relation to the wheel at any desired or suitable distance from the rail, and at the same time allow the brake shoe to be concentric with the wheel.

With this arrangement the brake head, after being applied suitably and at the desired angle with respect to the brake beam, is maintained in that position and at the same time permits of an automatic adjustment so that if there is any change in the relation of the brake beam and wheel, the brake head and its shoe automatically will be adjusted to concentricity with the wheel whenever the brakes are applied.

By referring to the figures of the drawings, it will be noted that I have shown a brake beam having a cylindrical trunnion 10, upon which my novel brake head 11 is adjustably mounted, the cylindrical trunnion being in the cylindrical opening 12 in the body of the brake head 11. The trunnion 10 of the brake beam has a circumferential groove 13 formed therein.

In the lower part of the brake head an opening or pocket 14 extends from the bottom of the brake head to and registers with the transverse cylindrical opening 12 of the brake head. This cylindrical pocket 14, which is at right angles to the opening 12, incases, among other things, a bearing block 15, the curved upper surface 16 of which bears against the surface of the circumferential groove 13 in the brake head trunnion. The bearing block 15 normally is pressed with a relatively great force and held in engagement with the groove 13 of the beam trunnion by a resilient member or coiled spring 17, the upper end of which presses against a spring cap 18 having a convex upper surface engaging the lower concaved surfaces of the spaced legs 19 of the bearing block. The lower end of the spring 17 is engaged by a collar 20 fitting in the lower end of the pocket 14. The spring cap 18 and the collar 20 are provided with alined central openings through which passes a threaded member or bolt 21, the upper end of which is provided with a head 21, preferably squared, which is received within a corresponding opening 22 of a bar or abutment 23, which preferably is cast integrally with the brake head and extends diametrically through the pocket 14 intermediate the legs 19 of the bearing block 15. The abutment 23 also has an opening 26 for the shank of the bolt 21 in alinement with the openings in the spring cap 18 and collar 20. To adjust the tension of the spring 17, and thereby the pressure with which the bearing block 15 engages the brake beam trunnion, a nut 24 is adjustably mounted upon the threaded end of the bolt 21. A lock nut 25 also is provided.

In assembling the parts the bolt 21 is inserted through the cylindrical opening 12 of the head and is passed down the central opening 26 in the abutment 23 until the head 21 of the bolt is located and anchored in the angular opening 22 in said abutment 23, whereupon the bearing block 15 also is passed through the opening 12 and placed within the pocket 14 in a manner such that the legs 19 of the block straddle the abutment 23. By means of the legs 19 of the block 15 straddling the abutment 23, the bearing block is held in proper alinement. At the same time the walls of the pocket 14 hold the bearing block against lateral movement. The cap 18, spring 17 and collar 20 are then inserted into the pocket 14 from the bottom thereof and the nut 24 applied to the bolt. After the brake head is applied to the trunnion, the tension of the spring 17, or, in other words, the pressure with which the bearing block engages the brake beam trunnion, may be adjusted by manipulation of the nut 24 and the parts locked in said adjusted position by the locking nut 25.

This brake head is relatively easy to manufacture, and at the same time possesses all of the essentials to meet the various requirements for successful commercial operation.

There may be various modifications of the invention, and it is my intention to cover all such modifications which do not involve a departure from the spirit and scope of the invention as set forth in the following claims.

What I claim is:

1. A brake head having a body portion with an opening for the reception of a brake beam trunnion, an opening registering with the first mentioned opening, an abutment bridging said second opening near the trunnion end thereof, a bearing block in said second opening, and means for varying the pressure with which said bearing block engages the trunnion including a bolt retained by said abutment.

2. A brake head having a body portion with registering openings, one of said openings for the reception of a brake beam trunnion, a bearing block in said other opening, a stationary abutment extending crosswise in said other opening, and pressure means for varying the pressure with which the bearing block engages the trunnion including a bolt which is anchored in said abutment.

3. A brake head having a body portion with registering openings, one of said openings for the reception of a brake beam trunnion, an abutment in the other opening, a trunnion bearing block in said other opening and having leg portions straddling said abutment, and pressure regulating means for varying the pressure with which said block engages the trunnion including a bolt, the head of which is anchored in said abutment.

4. A brake head having a body portion with intersecting openings, one for the reception of a brake beam trunnion, a stationary abutment extending crosswise in said second opening, a bearing block associated with said abutment, yieldable means mounted in said other opening, and means associated with said yieldable means for varying the pressure with which said bearing block engages the trunnion and including a bolt, the head of which is anchored in said abutment.

Signed at Hammond, Ind., this 2nd day of Jan., A. D., 1918.

BERNARD CONRATH.

Witnesses:
LOREN L. WHITNEY,
HERMAN C. KUHN.